US009256534B2

(12) United States Patent  
Li et al.

(10) Patent No.: US 9,256,534 B2  
(45) Date of Patent: Feb. 9, 2016

(54) DATA SHUFFLING IN A NON-UNIFORM MEMORY ACCESS DEVICE

(71) Applicant: International Business Machines Corporation, Armonk, NY (US)

(72) Inventors: Yinan Li, Madison, WI (US); Guy M. Lohman, San Jose, CA (US); Rene Mueller, San Jose, CA (US); Ippokratis Pandis, Palo Alto, CA (US); Vijayshankar Raman, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 14/147,917

(22) Filed: Jan. 6, 2014

(65) Prior Publication Data  
US 2015/0193344 A1  Jul. 9, 2015

(51) Int. Cl.  
*G06F 12/00* (2006.01)  
*G06F 12/08* (2006.01)

(52) U.S. Cl.  
CPC .......... *G06F 12/0808* (2013.01); *G06F 12/084* (2013.01); *G06F 12/0806* (2013.01); *G06F 12/0813* (2013.01); *G06F 12/0815* (2013.01); *G06F 12/0842* (2013.01); *G06F 2212/1024* (2013.01); *G06F 2212/271* (2013.01); *G06F 2212/603* (2013.01); *G06F 2212/62* (2013.01)

(58) Field of Classification Search  
CPC ............ G06F 12/0806; G06F 12/0813; G06F 12/0815; G06F 12/084; G06F 12/0842  
See application file for complete search history.

(56) References Cited  
U.S. PATENT DOCUMENTS 5,440,706 A   8/1995   Juri et al.  
6,026,461 A   2/2000   Baxter et al.  
6,067,603 A   5/2000   Carpenter et al.  
(Continued)

FOREIGN PATENT DOCUMENTS

EP    0467717 A2   1/1992  
EP    0981092 A2   2/2000  
JP    2004336341 A   11/2004

OTHER PUBLICATIONS

Lameter, "Effective Synchronization on Linux/NUMA Systems," Gelato Conference, May 20, 2005, pp. 1-23.  
(Continued)

*Primary Examiner* — Shawn X Gu  
(74) *Attorney, Agent, or Firm* — Cantor Colburn LLP; Bryan Butler

(57) ABSTRACT

Embodiments relate to the orchestration of data shuffling among memory devices of a non-uniform memory access device. An aspect includes a method of orchestrated shuffling of data in a non-uniform memory access device includes running an application on a plurality of threads executing on a plurality of processing nodes and identifying data to be shuffled among the plurality of processing nodes. The method includes registering the data to be shuffled and generating a plan for orchestrating the shuffling of the data. The method further includes disabling cache coherency of cache memory associated with the processing nodes and shuffling the data among all of the memory devices upon disabling the cache coherency, the shuffling performed based on the plan for orchestrating the shuffling. The method further includes restoring the cache coherency of the cache memory based on completing the shuffling of the data among all of the memory devices.

18 Claims, 4 Drawing Sheets

(56) References Cited

U.S. PATENT DOCUMENTS

| | | | |
|---|---|---|---|
| 6,081,874 | A | 6/2000 | Carpenter et al. |
| 6,085,293 | A | 7/2000 | Carpenter et al. |
| 6,349,394 | B1 | 2/2002 | Brock et al. |
| 6,658,538 | B2 | 12/2003 | Arimilli et al. |
| 6,687,756 | B1 | 2/2004 | Rawson, III |
| 7,200,757 | B1 | 4/2007 | Muralidhar et al. |
| 2007/0006271 | A1 | 1/2007 | Janus |
| 2012/0072624 | A1 | 3/2012 | Droux et al. |
| 2012/0272047 | A1 | 10/2012 | Macy, Jr. et al. |
| 2013/0080712 | A1 | 3/2013 | Anand et al. |
| 2013/0297888 | A1* | 11/2013 | Yamashita et al. ............ 711/141 |

OTHER PUBLICATIONS

Li et al., "The need for NUMA-aware algorithms: the case of data shuffling", ACM, 2013, pp. 1-8.

Li et al., "NUMA-aware algorithms: the case of data shuffling", 6th Biennial Conference on Innovative Data Systems Research (CIDR'13), Jan. 6-9, 2013, Asilomar, CA, pp. 1-10.

Zhang et al., "Accelerating the Data Shuffle Operations for FFT Algorithms on SIMD DSPs," School of Computer, National University of Defense Technology, Changsha, China, IEEE, 2011, 4 pages.

Zhang et al., "Optimizing Data Shuffling in Data-Parallel Computation by Understanding User-Defined Functions", Huazhong University of Science and Technology, Wuhan, 430074, China, 2012, pp. 1-14.

Albutiu et al., "Massively Parallel Sort-Merge Joins in Main Memory MultiCore Database Systems", PVLDB, 5(10), 2012, pp. 1064-1075.

Maddox et al., Weaving High Performance Multiprocessor Fabric. Intel Press. 2009, pp. 1-86.

Maddox et al., Weaving High Performance Multiprocessor Fabric. Intel Press. 2009, pp. 87-196.

Maddox et al., Weaving High Performance Multiprocessor Fabric. Intel Press. 2009, pp. 197-293.

Porobic et al., "OLTP on Hardware Islands", PVLDB, 5(11), 2012, pp. 1447-1458.

Schupbach et al., "Embracing diversity in the Barrelfish manycore operating system", In Proceedings of the Workshop on Managed Many-Core Systems, Jun. 24, 2008, pp. 1-9.

U.S. Appl. No. 14/147,912; Non Final Office Action; Date Filed: Jan. 6, 2014; Date Mailed: Jun. 18, 2015; 19 pages.

* cited by examiner

DATA SHUFFLING IN A NON-UNIFORM
MEMORY ACCESS DEVICE

BACKGROUND

The present disclosure relates generally to memory access devices and, more specifically, to data shuffling in non-uniform memory access devices.

Non-uniform memory access (NUMA) architectures have begun to emerge as architectures for improving processor performance, such as in multi-core processors. In a NUMA architecture, each socket or processing node has its own local memory, such as dynamic random access memory (DRAM), and each socket or processing node is connected to the other sockets to allow each socket to access the memory of each other socket. Thus, in NUMA architectures, access latency and bandwidth vary depending on whether a socket is accessing its own local memory or remote memory of another socket or processing node.

At some point in the execution of an application, threads executing on the processing nodes have to exchange intermediate results, including one or both of instructions and non-instruction data, with threads executing on other processing nodes. To exchange the results, the data is copied to the local memory associated with the destination thread. The copying is performed during a shuffle operation in which each thread exchanges data with some other thread. The shuffling is a global barrier for all participating threads. The shuffling starts after all threads have reached the barrier, and the threads resume processing only after shuffling among all of the threads is complete.

SUMMARY

Embodiments include a method and computer program product for orchestrated shuffling of data in a non-uniform memory access device. The device includes a plurality processing nodes, each processing node directly connected to at least one memory device and indirectly connected to at least one of the other memory devices via at least one of the other processing nodes. The method includes running an application on a plurality of threads executing on the plurality of processing nodes and identifying, by the plurality of threads, data to be shuffled from an initiating thread to a target thread executing on a different one of the plurality of processing nodes. The method includes registering, by the plurality of threads, the data to be shuffled among the plurality of threads and generating a plan for orchestrating the shuffling of the data among the all of the memory devices associated with the plurality of threads. The method also includes disabling cache coherency of cache memory associated with the processing nodes and shuffling the data among all of the memory devices upon disabling the cache coherency, the shuffling performed based on the plan for orchestrating the shuffling. The method also includes restoring the cache coherency of the cache memory based on completing the shuffling of the data among all of the memory devices.

Further embodiments include a non-uniform memory access system. The system includes a plurality of processing nodes including processing circuitry to execute instructions. The system further includes a plurality of local memory modules, each local memory module directly connected to one of the plurality of processing nodes and indirectly connected to at least another of the plurality of processing nodes via the one of the plurality of processing nodes. The system further includes an orchestrated plan generator to receive from threads executing on the plurality of processing nodes data shuffling information of data to be shuffled among the plurality of memory modules, and to generate a data shuffling plan that orchestrates shuffling of the data among the plurality of memory modules. The system further includes a coherence manager to disable cache coherency of cache memory associated with the processing nodes prior to a shuffling operation and to restore the cache coherency of the cache memory based on completing the shuffling of the data among all of the memory devices. The system further includes a number of direct memory access (DMA) transfer engines that autonomously copy data between the local memory modules of the processing nodes without involvement of source or destination processing node themselves.

Additional features and advantages are realized through the techniques of the present disclosure. Other embodiments and aspects of the present disclosure are described in detail herein and are considered a part of the claimed disclosure. For a better understanding of the disclosure with the advantages and the features, refer to the description and to the drawings.

BRIEF DESCRIPTION OF THE SEVERAL
VIEWS OF THE DRAWINGS

The subject matter of the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

In systems employing non-uniform memory access architectures, latency and bandwidth vary depending upon whether a processing node is accessing its own local memory or the memory associated with another processing node. Embodiments of the invention improve latency and bandwidth by orchestrated shuffling of data partitions and instruction-execution locations while processing the data partitions.

Figure 1:
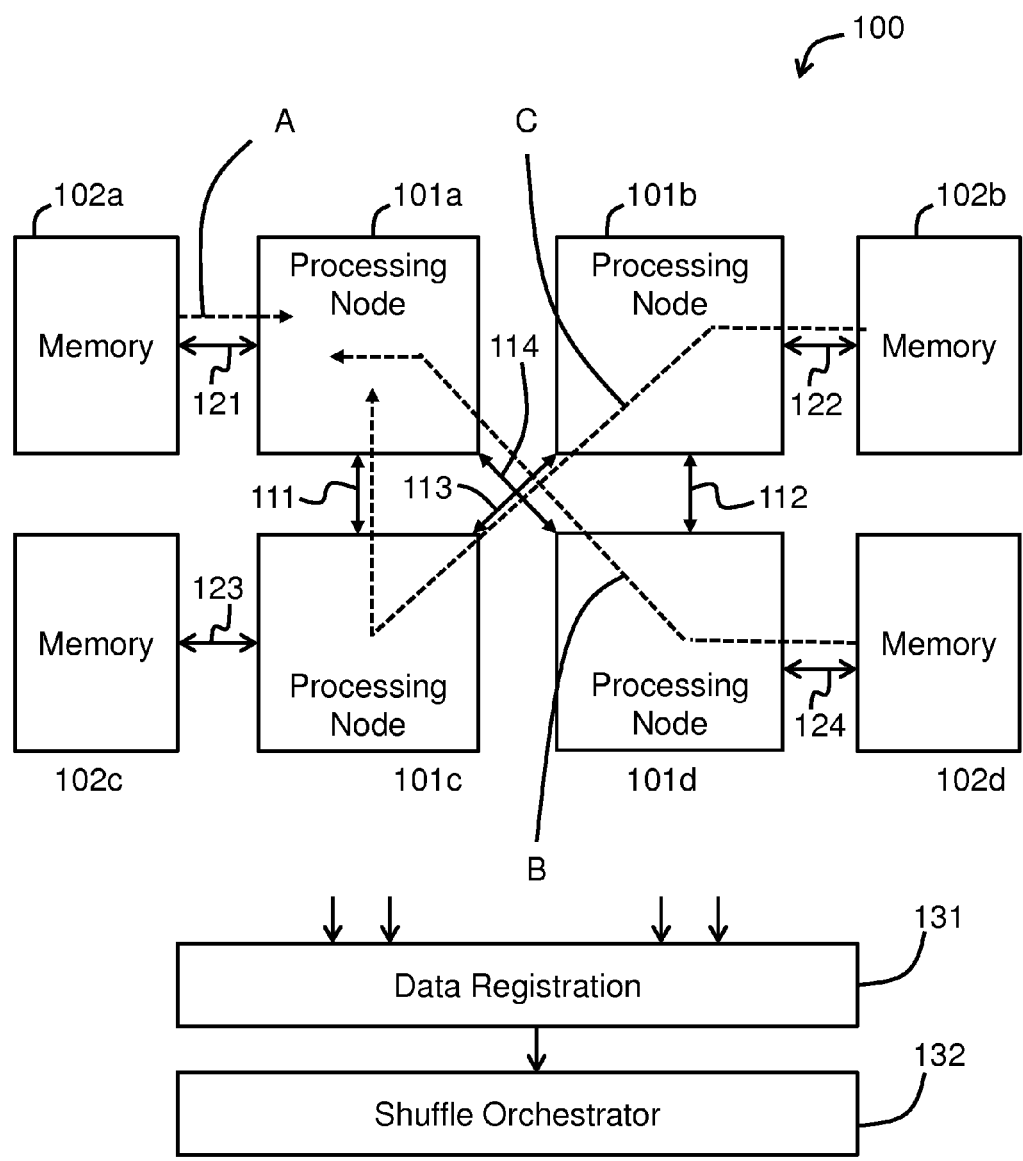
FIG. 1 illustrates a non-uniform memory access system in accordance with an embodiment.

Turning now to FIG. 1, a non-uniform memory access (NUMA) system 100 is generally shown in accordance with an embodiment. The system 100 includes processing nodes 101a, 101b, 101c and 101d. In one embodiment, each processing node is a separate processing chip, a separate processor package or a separate processor socket. In another embodiment, at least one of the processing nodes 101a to 101d is a separate processing core than another of the processing nodes 101a to 101d. For example, the processing node 101a may be a processing core on a first processor microchip, the processing node 101b may be a processing core on the same first processor microchip, and the processing node 101d may be a processing core on a separate, second processor microchip.

In the present specification and claims, the NUMA architecture is characterized by local memory 102a to 102d that is directly connected to one of the processing nodes 101a to 101d and indirectly connected to the other processing nodes 101*a* to 101*d* via at least one intervening processing node 101*a* to 101*d*. As a result, the time that it takes to access instructions and data from the local memory 102*a* to 102*d* varies based on the processing node 101*a* to 101*d* that is accessing the data and instructions.

In the embodiment illustrated in FIG. 1, the processing node 101*a* is directly connected to local memory 102*a* via a data connection 121; the processing node 101*b* is directly connected to local memory 102*b* via a data connection 122; the processing node 101*c* is directly connected to local memory 102*c* via a data connection 123; and the processing node 101*d* is directly connected to local memory 102*d* via a data connection 124. In the present specification and claims, the term "directly connected" means that there is no intervening processing node 101*a*, although embodiments of the invention encompass other intervening circuitry, such as passive components (resistors, capacitors, etc.) and data processing or filtering elements. Conversely, the term "indirectly connected" means that there is at least one processing node 101*a* to 101*d* that is located between the requesting processing node 101*a* to 101*d* and the local memory 102*a* to 102*d* that stores the data or instructions being accessed.

In the embodiment illustrated in FIG. 1, the processing node 101*a* is indirectly connected to memory 102*b* via the intervening processing nodes 101*b* and 101*c*. The processing node 101*c* is connected to the processing node 101*a* by the data connection 111, and the processing node 101*c* is connected to the processing node 101*b* by the data connection 113. The processing node 101*a* is indirectly connected to memory 102*c* via the intervening processing node 101*c*; and the processing node 101*a* is indirectly connected to memory 102*d* via the intervening processing node 101*d*, and the processing nodes 101*a* and 101*d* are connected via the data connection 114.

While one configuration of data connections among local memory 102*a* to 102*d* and processing nodes 101*a* to 101*d* is illustrated in FIG. 1, embodiments of the invention encompass any configuration of data connections among a plurality of local memory and a plurality of processing nodes, where the plurality of processing nodes are directly connected to at least one local memory and indirectly connected to at least one local memory via another of the plurality of processing nodes, according to a NUMA architecture. For example, in an alternative embodiment, the processing nodes 101*a* and 101*b* may be connected by a data connection, and the processing nodes 101*c* and 101*d* may be connected by a data connection. In addition, while FIG. 1 illustrates an example NUMA system having four processing nodes 101*a* to 101*d*, embodiments of the invention encompass any number of processing nodes greater than one, such as six, eight, twelve, sixteen, etc.

In operation, each processing node 101*a* to 101*d* executes one or more program threads by accessing the corresponding local memory 102*a* to 102*d*. For example, the processing node 101*a* executes a program thread that issues a load or store instruction to an address in its local memory 102*a*. However, the thread may also issue a load or a store instruction that refers to data on remote local memories 102*b* to 102*d*, resulting in data contention on the interconnects and processing nodes 101*a* to 101*d*.

For example, data from memory 102*a* that is destined for a thread executed by the processing node 101*a* must travel only a distance A via the interconnect 121. Data from memory 102*d* destined for the thread executed by the processing node 101*a* must travel a distance B via the interconnect 124, the processing node 101*d*, and the interconnect 114. Data from memory 102*b* destined for the thread executed by the processing node 101*a* must travel a distance C via the interconnect 122, the processing node 101*b*, the interconnect 113, the processing node 101*c*, and the interconnect 111. Accordingly, data contention would occur in the processing node 101*b* and the interconnect 122 when both the processing node 101*c* and the processing node 101*b* need to access data in the local memory 102*b*. Similar data contention occurs in any interconnect and processing node along a path used by multiple processing nodes 101*a* to 101*d* to access data from one or more local memory devices 102*a* to 102*d*.

In embodiments of the invention, when a processing node 101*a*, 101*b*, 101*c*, or 101*d* identifies data that is to be processed by another one of the processing nodes 101*a*, 101*b*, 101*c*, or 101*d*, the originating processing node 101*a*, 101*b*, 101*c*, or 101*d* provides information about the data, such as an original location and a destination, to the data registration unit 131. The data registration unit 131 includes data, such as a table, stored in memory (not shown in FIG. 1) that stores information, provided by the processing nodes 101*a*, 101*b*, 101*c*, and 101*d*, regarding data that is to be shuffled among the memory 102*a*, 102*b*, 102*c*, and 102*d*.

A shuffle orchestrator 132 obtains the information regarding data-to-be-shuffled from the data registration unit 131 and generates an orchestrated data shuffling plan for all of the processing nodes 101*a*, 101*b*, 101*c*, and 101*d* to follow during a data shuffling operation. At some point during the execution of an application by the processing nodes 101*a*, 101*b*, 101*c*, and 101*d*, the application is halted to perform the data shuffling operation, and the data is shuffled among the memory modules 102*a*, 102*b*, 102*c*, and 102*d* according to the orchestrated data shuffling plan. When the shuffling is complete, the application resumes, additional data shuffling information is collected, and the process repeats itself. Accordingly, embodiments of the invention encompass systems and methods for orchestrating a data shuffling operation.

Figure 2:
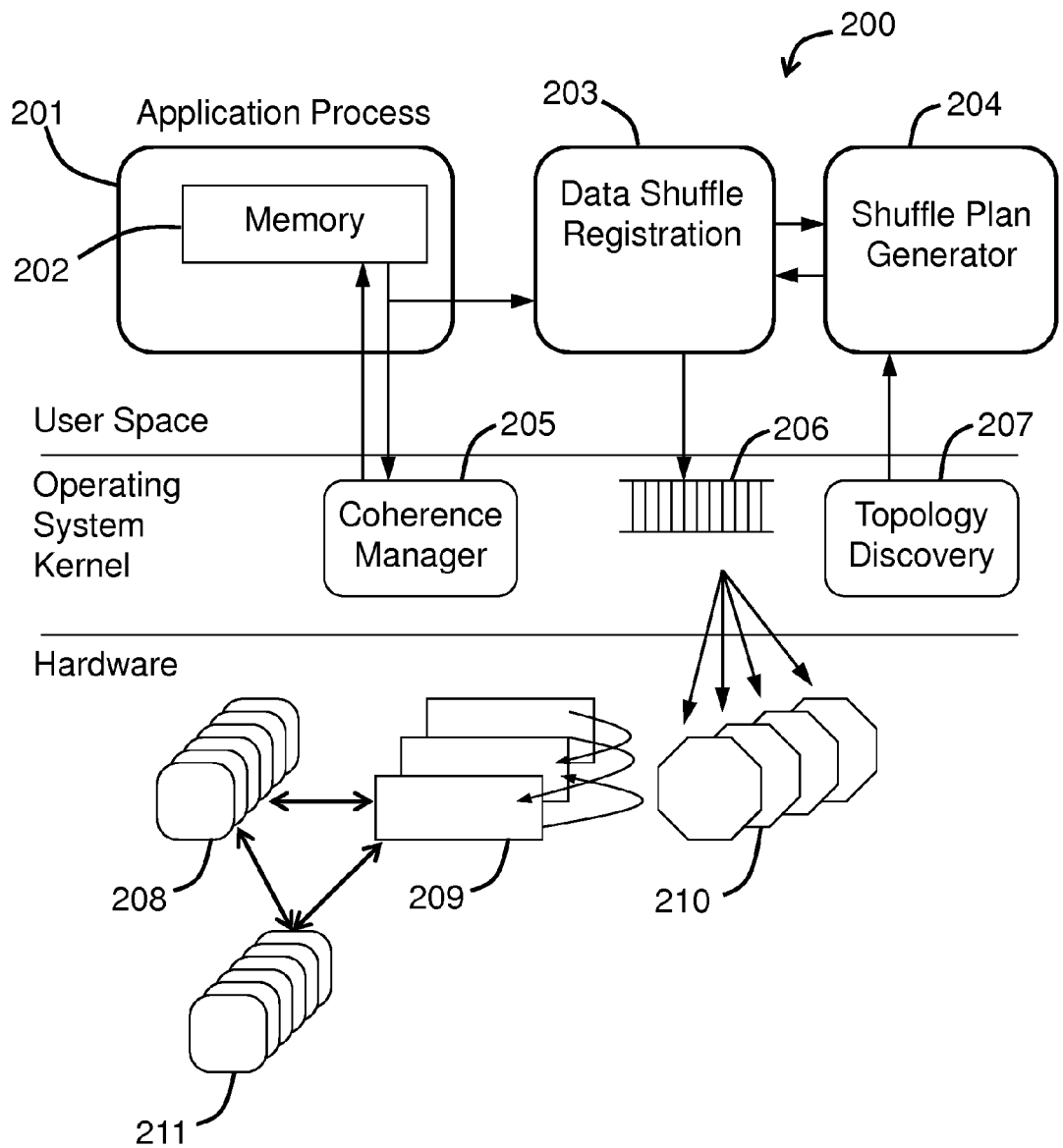
FIG. 2 illustrates a functional block diagram of an orchestrated data shuffling process system in accordance with an embodiment.
Figure 3:
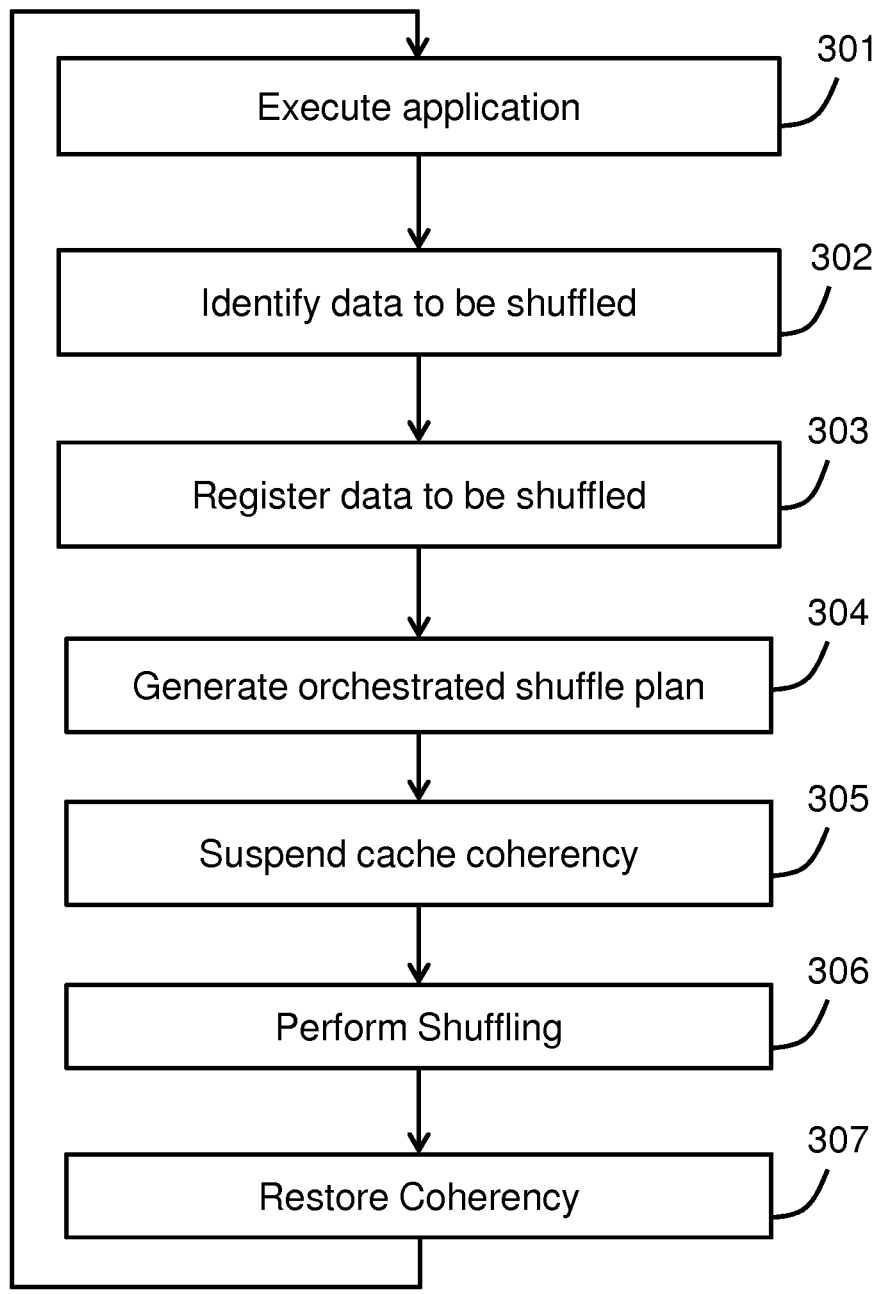
FIG. 3 is a flow diagram of a method of orchestrating a data shuffling operation system in accordance with an embodiment.

FIG. 2 is a functional block diagram of a system 200 for performing orchestrated data shuffling according to an embodiment of the invention, and FIG. 3 is a flow diagram of a process for orchestrating the data shuffling on the system 200. FIGS. 2 and 3 are described together in the paragraphs that follow.

The process illustrated by FIG. 3 begins in block 301 by running an application 201 in a user space, or the portion of system memory dedicated to running user applications. The user space also includes a data shuffle registration unit 203 and a shuffling plan generator 204. The application 201 runs multiple threads corresponding to the multiple processing nodes 208 of the hardware layer. Each processing node 208 may run a separate thread or multiple threads simultaneously.

As the application 201 runs, the application gathers memory information 202, and in particular information regarding where data originates among the memory modules 209 and where data needs to be transmitted to be processed. In block 302, the application 201 identifies data in the memory modules 209 that is to be processed by another memory module 209. In particular, the application 201 determines that data in a first memory module among the plurality of memory modules 209 directly connected to a first processing node among the plurality of processing nodes 208 should be processed by a second processing node among the plurality of processing nodes 208, and the first memory module is indirectly connected to the second processing node via the first processing node. Thus, the data in the first memory module is identified as a candidate to be shuffled among the memory modules 209 in a data shuffling operation.

In block 303, the application 201 transmits information corresponding to the data-to-be-shuffled among the plurality of memory modules 209 to the data shuffle registration unit 203, which stores the information regarding the data-to-be-shuffled for all of the memory modules 209 and processing nodes 208. The information corresponding to the data-to-be-shuffled may include a source offset, size, destination location, and any other information. While the data shuffle registration unit 203 is illustrated in FIG. 1 in the user space, it may also be located in the operating system kernel or the hardware space.

When a predetermined threshold, or global barrier, is met, the application 201 stops running, or stops executing threads on the plurality of processing nodes 208. The predetermined threshold may be any type of threshold, including an operation characteristic of the application 201, such as the ability of the application 201 to continue executing threads, a determination that a predetermined amount of data information has been registered with the data shuffle registration unit 203, or any other criteria affecting the transmission of data among the plurality of memory modules 209.

When the predetermined threshold is met and the application 201 stops running, the data shuffle registration unit 203 takes all the registered data from all of the threads executing on the plurality of processing nodes 208 and generates an orchestrated data shuffling plan in block 304 of FIG. 3. In one embodiment, the data shuffle registration unit 203 provides the registration data of the data-to-be-shuffled to a shuffle plan generator 204, which processes the registered data, generates the orchestrated data plan, and returns the orchestrated data plan including an order of copying of the data during the shuffling operation to the data shuffle registration unit 203. In one embodiment, the shuffle plan generator is a linear programming (LP) solver, and the shuffle operation is expressed as an instance of Linear Programming.

The orchestrated data shuffle plan may be based on any criteria, such as a number of the plurality of processing nodes 208, a bandwidth of the direct link between any two of the plurality of processing nodes 208, and routing tables defining data transmission paths among the plurality of processing nodes 208. The routing tables include information regarding the direct and indirect data transmission paths required to transmit data from one memory module 209 to another memory module 209. In one embodiment, the number of the plurality of processing nodes 208, the bandwidth of each direct link between the plurality of processing nodes 208, and the routing tables are obtained from a topology discovery module 207 in the operating system kernel. In one embodiment, the topology discovery module 207 obtains the data regarding the topology of the system 200 when the system starts up or boots up from a power-off state. Topology and link bandwidth changes due to hardware failures are tracked in the topology discovery module 207 by monitoring machine check exceptions.

The shuffle plan generator 204 assigns a transfer to each link in the interconnect fabric for a given time instant. In one embodiment, the link capacities and routing information are specified as constraints, and the number of time steps is provided as an objective function that is to be minimized, which results in minimizing the overall duration of the entire shuffling operation.

When the predetermined threshold is met and the application 201 stops running, the coherence manager 205, located in the operating system kernel level, suspends the coherence of the cache memory 211 associated with the plurality of processing nodes 208 and memory modules 209 in block 305 of FIG. 3. Each processing node 208 is associated with a separate cache memory device 211. While running the application 201, there may be many copies of any one data item among the plurality of cache memory devices 211. When one copy of a data item is modified, the other copies of the data item are either removed from the respective cache memory or updated accordingly to maintain coherence of the data among the plurality of cache devices 211.

To maintain the coherence of the cache memory 211, the cache memory 211 implements a coherency protocol which utilizes the data transmission lines interconnecting the plurality of processing nodes 208, such as the data connections 111 to 114 of FIG. 1, which results in additional data transmission and, potentially, data transmission bottlenecks due to contention. Thus, suspending the coherency of the cache devices 211 during data shuffling operations increases bandwidth for data shuffling and increases the speed of the data shuffling operations. During the suspension of the coherency protocol, all processes other than the data shuffling are prevented from accessing the hardware layer of the system 200 to prevent changes to data in the plurality of cache devices 211.

Upon suspending the coherency of the cache memory devices 211, the data shuffle registration unit 203 inserts the order of data transfers based on the orchestrated data shuffle plan into the transfer queue 206 residing in the operating system kernel level. The transfer engines 210 retrieve the order of data transfers from the transfer queue 206 and perform the data shuffle among the memory modules 209 to carry out the data shuffle operation in block 306 of FIG. 3.

In the embodiment illustrated in FIG. 2, the transfer engines 210 are implemented at the hardware level, and the transfer engines 210 retrieve the data-to-be-shuffled from source memory modules 209 and transmit the data-to-be-shuffled to the target memory modules 209. Hardware transfer engines 210 can manage multiple transfers concurrently. They may operate in a manner similar to Direct-Memory Access (DMA) engines, except unlike DMA engines, the hardware transfer engines 210 do not exchange data between memory and an I/O device. Instead, the transfer engines 210 transfer the data among the plurality of memory modules 209 in the host memory.

In one embodiment the transfer engine functionality may be provided in software rather than in hardware, or hardware-assisted. In such an embodiment, the software-based transfer engines, executed by one or more processors, de-queue the transfer tasks from the transfer queue 206 in the operating system kernel layer, and provide the transfer tasks to the plurality of processing nodes 208 in the hardware layer, which perform the data shuffling. For transfers within the same address space, the data transfer is performed directly in user-space. For all other transfers, the transfers must be performed in a privileged mode. In order to saturate the links, more than one core (thread) may be used for a single transfer path. The number of threads used depends on the characteristics of the interconnect network and the socket-local memory bandwidth. Both are determined during the discovery phase and adjusted if the underlying hardware configuration changes at runtime as a result of a hardware failure. The number of threads used for the transfer are also determined by the networking model and computed when generating the shuffle plan.

Once all of the transfers of the shuffle are completed, the coherency manager 205 re-enables the coherency of the cache memory devices 211 in block 307 of FIG. 3, the shuffled data is processed by the processing nodes 208 to which the data was shuffled, and the processing of the application 201 continues.

Although only one of the levels illustrated in FIG. 2 is described as a "hardware" level, it is understood that every aspect of FIG. 2 may be implemented in computer hardware, including one or more processors and memory. For example, the application 201 is run by executing a computer program stored in memory, including the memory modules 209, on one or more processors, including the processing nodes 208. In embodiments of the invention, the processing nodes 208 may include processor cores executing one or more threads per processor core. Alternatively, the processing nodes 208 may include processors, each including one or more processing cores. The processing nodes 208 may correspond to the processing nodes 101a to 101d of FIG. 1, for example. Similarly, the operating system kernel is stored in memory and executed on one or more processor to interface between the user space and the hardware layer of a computer system.

Figure 4:
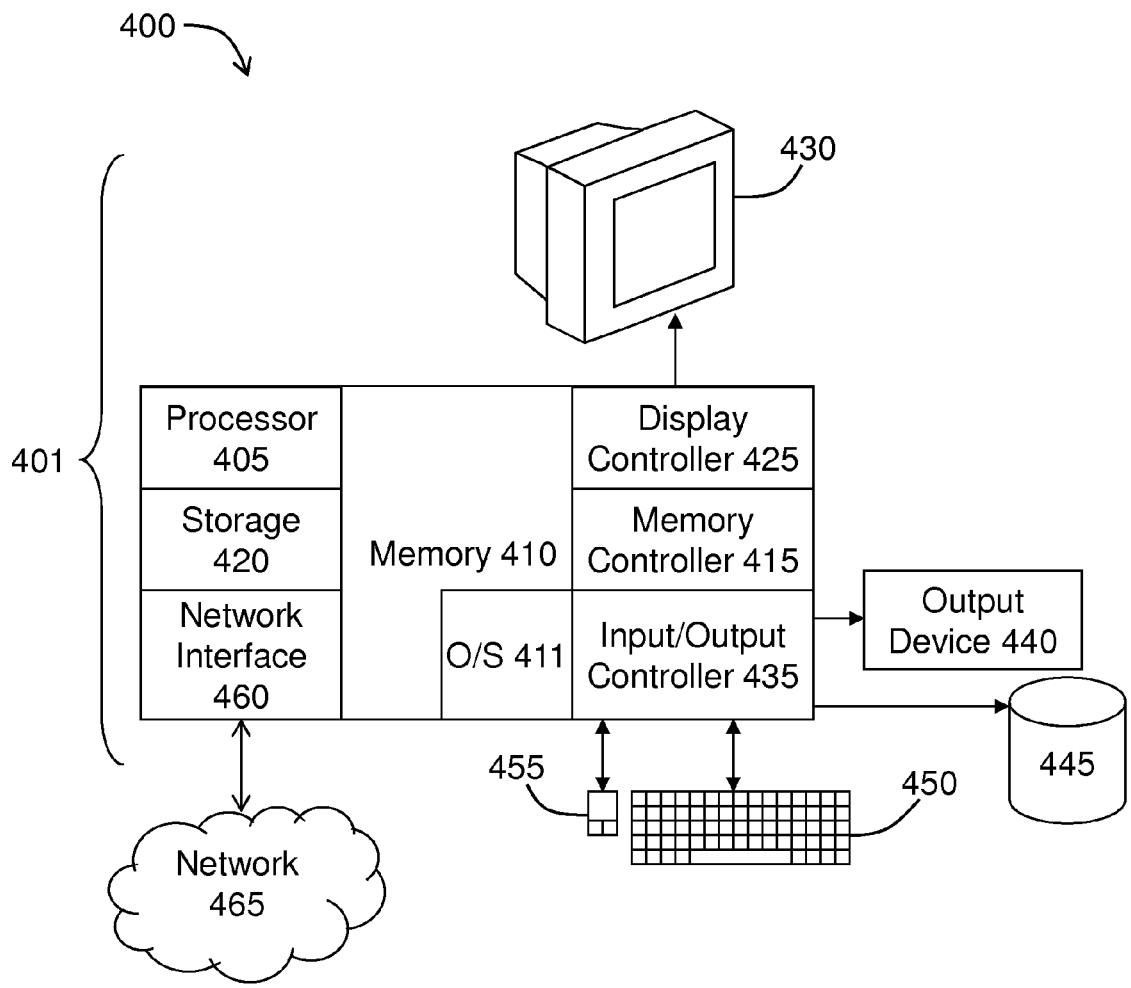
FIG. 4 illustrates a computer system in accordance with an embodiment.

FIG. 4 illustrates a block diagram of a computer system 400 according to an embodiment of the present disclosure. The methods described herein can be implemented in hardware, software, or a combination thereof. In an exemplary embodiment, the methods described herein are implemented in hardware as part of the microprocessor of a special or general-purpose digital computer, such as a personal computer, workstation, minicomputer, or mainframe computer. The system 400 therefore may include general-purpose computer or mainframe 401.

In an exemplary embodiment, in terms of hardware architecture, as shown in FIG. 4, the computer 401 includes a one or more processors 405, memory 410 coupled to a memory controller 415, and one or more input and/or output (I/O) devices 440, 445 (or peripherals) that are communicatively coupled via a local input/output controller 435. The input/output controller 435 can be, for example, one or more buses or other wired or wireless connections, as is known in the art. The input/output controller 435 may have additional elements, which are omitted for simplicity in description, such as controllers, buffers (caches), drivers, repeaters, and receivers, to enable communications. Further, the local interface may include address, control, and/or data connections to enable appropriate communications among the aforementioned components. The input/output controller 435 may access the output devices 440 and 445.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions.

The memory 410 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (O/S) 411. The operating system 411 essentially controls the execution of other computer programs and provides scheduling, input-output control, file and data management, memory management, and communication control and related services.

In an exemplary embodiment, a conventional keyboard 450 and mouse 455 can be coupled to the input/output controller 435. Other output devices such as the I/O devices 440, 445 may include input devices, for example, but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be any type of network, such as an IP-based network for communication between the computer 401 and any external server, client and the like via a broadband connection, an optical fiber network, or any other type of network.

The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

When the computer 401 is in operation, the processor 405 is configured to execute instructions stored within the memory 410, to communicate data to and from the memory 410, and to generally control operations of the computer 401 pursuant to the instructions.

In an exemplary embodiment, the methods of orchestrated data shuffling in a NUMA device or system described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In embodiments of the present disclosure, the processor 405 includes multiple processing nodes, such as multiple processors and/or multiple processor cores. In addition, the memory 410 includes multiple local memory devices, such that each separate processing node is directly connected to at least one local memory via a data connection and indirectly connected to at least one other local memory via another processing node. The processes of orchestrated data shuffling may be performed by the processor 405.

Technical effects and benefits include improving latency and bandwidth in a non-uniform memory access system by orchestrating data shuffling among a plurality of data devices.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of orchestrated shuffling of data in a non-uniform memory access device that includes a plurality of processing nodes, each processing node directly connected to at least one memory device and indirectly connected to at least one of the other memory devices via at least one of the other processing nodes, the method comprising:
running an application on a plurality of threads executing on the plurality of processing nodes;
identifying, by the threads, data to be shuffled from source threads running on source processing nodes among the processing nodes to target threads executing on target processing nodes among the processing nodes;
registering, by the plurality of threads, the data to be shuffled among threads by transferring the data from source memory devices directly connected to the source processing nodes to target memory devices directly connected to the target processing nodes;
generating a plan for orchestrating the shuffling of the data among all memory devices associated with the plurality of threads;
disabling cache coherency of cache memory associated with the plurality of processing nodes;
performing the shuffling of the data among all memory devices upon disabling the cache coherency, based on the plan for orchestrating the shuffling; and
restoring the cache coherency of the cache memory based on completing the shuffling of the data among all memory devices.

2. The method of claim 1, wherein shuffling data among all memory devices includes storing an order of transferring data in a transfer queue maintained in an operating system kernel.

3. The method of claim 2, wherein shuffling data among memory devices includes de-queuing, by a plurality of transfer engines, the order of transferring data from the transfer queue, and transferring data, by the transfer engines, among all memory devices.

4. The method of claim 1, further comprising:
preventing user applications from accessing memory devices while the cache coherency is disabled.

5. The method of claim 1, wherein generating the plan includes generating the plan based on a number of the plurality of processing nodes, a bandwidth of each direct link between the processing nodes, and routing tables defining data transmission paths among the plurality of processing nodes.

6. The method of claim 5, wherein the number of the plurality of processing nodes, the bandwidth of each direct link between the plurality of processing nodes, and the routing tables defining data transmission paths among the plurality of processing nodes are determined at a start-up of the non-uniform memory access device and maintained at runtime by tracking machine check exceptions.

7. A computer program product for orchestrating shuffling between a plurality of memory devices directly connected to a respective plurality of processing nodes in a non-uniform memory access device, the computer program product comprising:
non-transitory computer-readable storage medium having program code embodied therewith, the program code executed by at least one processor to:
run an application on a plurality of threads executing on the processing nodes;
identify, by the threads, data to be shuffled from an initiating thread to a target thread executing on a different one of the processing nodes;
register, by the plurality of threads, the data to be shuffled among the plurality of threads;
generate a plan for orchestrating the shuffling of the data among memory devices associated with the plurality of threads;
disable cache coherency of cache memory associated with the processing nodes;
shuffle the data among memory devices upon disabling the cache coherency, based on the plan for orchestrating the shuffling of the data; and
restoring the cache coherency of the cache memory based on completing shuffling of the data among memory devices.

8. The computer-program product of claim 7, wherein shuffling the data among memory devices includes storing an order of transferring the data in a transfer queue maintained in an operating system kernel.

9. The computer-program product of claim 8, wherein shuffling the data among memory devices includes de-queuing, by a plurality of transfer engines, the order of transferring data from the transfer queue, and transferring the data, by the transfer engines, among memory devices.

10. The computer-program product of claim 7, wherein the method further comprises:
preventing user applications from accessing the cache memory while the cache coherency is disabled.

11. The computer-program product of claim 7, wherein generating the plan includes generating the plan based on a number of the processing nodes, a bandwidth of each direct link between the processing nodes, and routing tables defining data transmission paths among the processing nodes.

12. The computer-program product of claim 11, wherein the number of the processing nodes, the bandwidth of each direct link between the processing nodes, and the routing tables defining data transmission paths among the processing nodes are determined at a start-up of the non-uniform memory access device and maintained at runtime by tracking machine check exceptions.

13. A system, comprising:
a plurality of processing nodes including processing circuitry to execute instructions;
a plurality of local memory devices, each local memory device directly connected to one of the processing nodes and only indirectly connected to at least another of the processing nodes via the one of the processing nodes;
a shuffle plan generator configured to receive, from threads executing on the processing nodes, data shuffling information of data to be shuffled among the memory devices, and to generate a data shuffling plan that orchestrates shuffling of the data among the memory devices; and
a coherence manager configured to disable a cache coherency of cache memory associated with the processing nodes prior to a data shuffle operation, and to restore the cache coherency of the cache memory based on completing the shuffling of the data among the memory devices.

14. The non-uniform memory access system of claim 13, further comprising:
a plurality of data transfer engines to shuffle the data among the memory devices based on the orchestrated plan.

15. The non-uniform memory access system of claim 14, further comprising a transfer queue in memory, the transfer queue storing an order of shuffling the data among the memory devices based on the data shuffling plan, wherein the transfer engines shuffle the data among the memory devices based on the order of shuffling the data indicated by the order stored in the transfer queue.

16. The non-uniform memory access system of claim 15, wherein the transfer queue is maintained by an operating system kernel.

17. The non-uniform memory access system of claim 13, further comprising:
   a coherence manager configured to disable cache coherency of cache memory associated with the processing nodes based on a determination that data shuffling is ready to be performed among the memory devices, and to restore the cache coherency of the cache memory based on determining that the shuffling of the data among the memory devices has been completed.

18. The non-uniform memory access system of claim 13, wherein the data shuffling plan generator is configured to generate the data shuffling plan based on a number of the processing nodes, a bandwidth of each direct link between the processing nodes, and routing tables defining data transmission paths among the processing nodes.

\* \* \* \* \*